US011646958B2

(12) United States Patent
Charles et al.

(10) Patent No.: US 11,646,958 B2
(45) Date of Patent: May 9, 2023

(54) OPTIMIZED PATH SELECTION BY NON-LATENCY DETECTING MULTIPATH HOSTS

(71) Applicant: Dell Products, L.P., Hopkinton, MA (US)

(72) Inventors: Peniel Charles, Bangalore (IN); Owen Crowley, Carrigaline (IE); Gopinath Marappan, Coimbatore (IN)

(73) Assignee: Dell Products, L.P., Hopkinton, MA (US)

( * ) Notice: Subject to any disclaimer, the term of this patent is extended or adjusted under 35 U.S.C. 154(b) by 108 days.

(21) Appl. No.: 17/495,119

(22) Filed: Oct. 6, 2021

(65) Prior Publication Data

US 2023/0103809 A1    Apr. 6, 2023

(51) Int. Cl.
*H04L 45/125*    (2022.01)
*H04L 45/24*    (2022.01)

(52) U.S. Cl.
CPC ............ *H04L 45/125* (2013.01); *H04L 45/24* (2013.01)

(58) Field of Classification Search
None
See application file for complete search history.

(56) References Cited

U.S. PATENT DOCUMENTS

| 6,973,555 | B2* | 12/2005 | Fujiwara | G06F 3/065 |
| | | | | 711/170 |
| 2007/0011543 | A1* | 1/2007 | Yoshimura | G01R 31/318328 |
| | | | | 714/738 |
| 2017/0005919 | A1* | 1/2017 | Wang | H04L 45/123 |
| 2021/0109658 | A1* | 4/2021 | Mallick | G06F 9/505 |

* cited by examiner

*Primary Examiner* — Eunsook Choi
(74) *Attorney, Agent, or Firm* — Anderson Gorecki LLP

(57) ABSTRACT

Multipath hosts with the ability to detect path latency, report latency values on paths between the Latency Detecting (LD) host and a set of storage systems. The detected latency values are used by the storage system to create a data structure correlating path information with the detected latency values. When hosts without the ability to detect path latencies (non-LD hosts) connect to the storage systems, the path information about paths used by the non-LD hosts is used to determine reported latency values for paths with similar path information, to generate presumed latency values for the paths used by the non-LD hosts. Where paths used by non-LD hosts have higher latency values, the storage system sets a path attribute value, such as an ALUA state for the path, to signal non-LD hosts to preferentially use paths with lower presumed latency values.

14 Claims, 6 Drawing Sheets

FIG. 7
Host Table

| Host ID | FCID | Fabric | Path Latency | ALUA State |
|---|---|---|---|---|
| LD host $300_1$ | Edge Switch $210_1$ | Fabric $220_1$ | 0008 | - |
| LD host $300_1$ | Edge Switch $210_2$ | Fabric $220_3$ | 0020 | - |
| Non-LD host $400_1$ | Edge Switch $210_2$ | Fabric $220_3$ | Presumed: 0020 | Active-Not-Optimized |
| Non-LD host $400_1$ | Edge Switch $210_1$ | Fabric $220_1$ | Presumed: 0008 | Active-Optimized |
| ... | ... | ... | ... | ... |

OPTIMIZED PATH SELECTION BY NON-LATENCY DETECTING MULTIPATH HOSTS

FIELD

This disclosure relates to computing systems and related devices and methods, and, more particularly, to a method and apparatus for optimizing path selection by multipath hosts which lack the ability to detect path latency values to a set of storage systems hosting a storage volume for the host.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Multipath hosts with the ability to detect path latencies, report latency values on paths between the Latency Detecting (LD) host and a set of storage systems. The detected latency values are used by the storage systems to create a data structure correlating path information from the LD hosts to the storage system and detected latency values on those paths. When hosts without the ability to detect path latency (non-LD hosts) connect to the storage systems, the path information about paths used by the non-LD hosts is used to determine whether any LD host has provided a reported latency values for a path with similar path information. The reported latency values for similar paths are used to generate presumed latency values for the paths used by the non-LD hosts. Where paths used by non-LD hosts have higher presumed latency values, the storage system sets a path attribute value to indicate that the path has a higher latency value than latency values for other paths. An example path attribute might include an ALUA state for the path. By setting the path attribute, the storage system is able to signal non-LD hosts to preferentially use paths with lower presumed latency values.

BRIEF DESCRIPTION OF THE DRAWINGS

FIG. 7 is an example data structure maintained by storage systems to enable the storage systems to set path state attributes of paths used by LD hosts and non-LD hosts, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
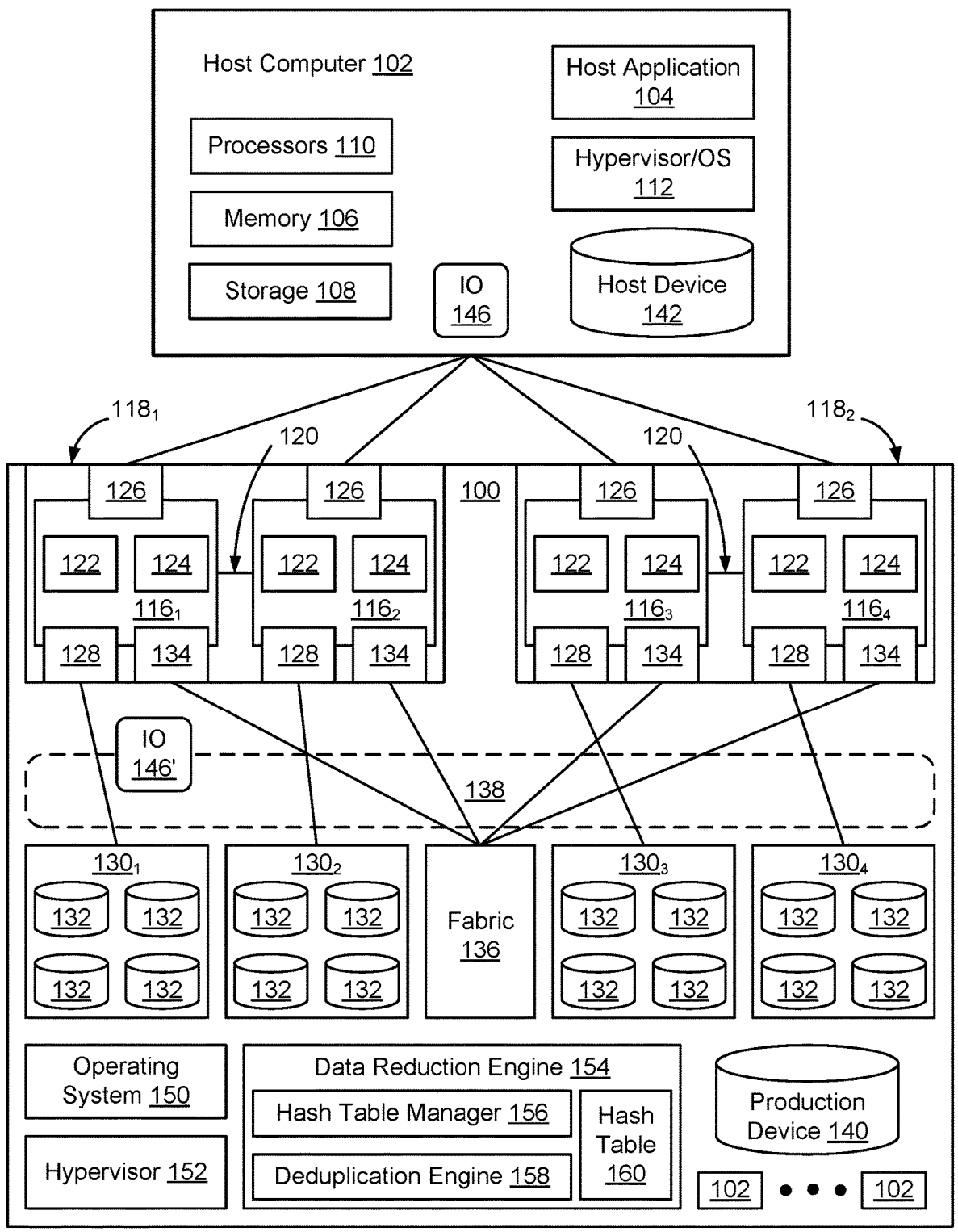
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140.

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. The host computer 102 can then execute read/write IOs on the TDev to access the data of the production device 140.

Figure 2:
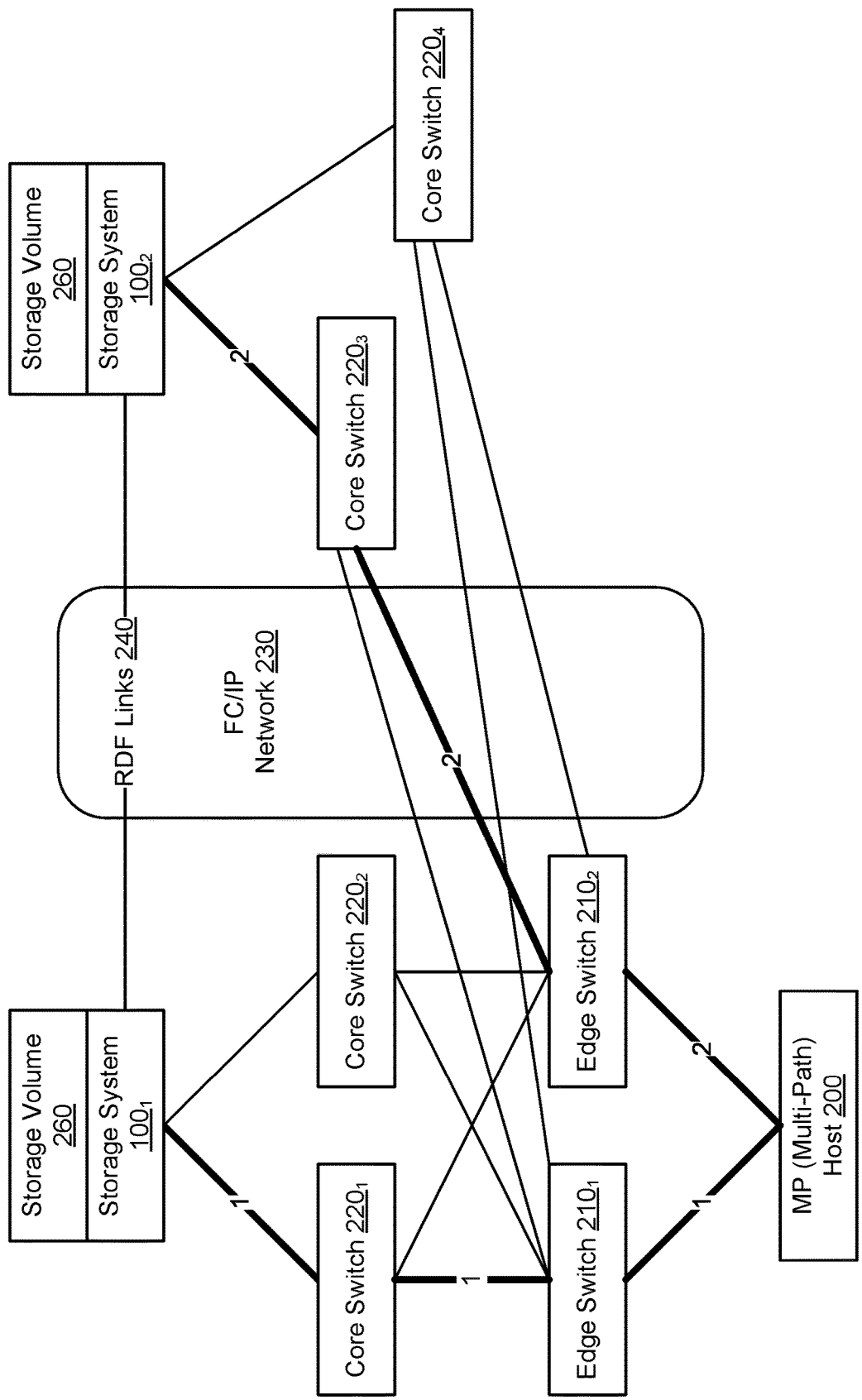
FIG. 2 is a functional block diagram of an example storage environment in which a MP (Multi-Path) host is connected to a storage volume presented to the MP host by multiple storage systems, according to some embodiments.

In high availability environments a given distributed LUN may be presented to a host 102 or to a cluster of hosts 102 as a single virtual device from multiple storage systems 100. FIG. 2 is a functional block diagram of an example storage environment in which a MP (Multi-Path) host 200 is connected to a storage volume 260 presented to the MP host 200 by multiple storage systems $100_1$, $100_2$, according to some embodiments. Although only two storage systems $100_1$, $100_2$ are shown in FIG. 2, it should be understood that multiple storage systems may present the storage volume 260 to host 200. Likewise, multiple hosts 200 may access the storage volume 260 on the set of storage systems $100_1$, $100_2$. In some embodiments, the RDF links 240 are used to mirror storage volume 260 between the storage systems $100_1$, $100_2$, to enable the storage systems $100_1$, $100_2$, to have a synchronized view of the storage volume 260.

In an environment where multiple storage systems 100 present a storage volume 260 to a given host 200, the paths from the host 200 to the storage systems 100 hosting the LUN (storage volume 260) will inevitably encounter varying levels of latency. For example, in FIG. 2, host 200 is connected to storage system $100_1$ by a first path 1 traversing through edge switch $210_1$, core switch $220_1$, and is connected to storage system $100_2$ by a second path 2 traversing through edge switch $210_2$ and core switch $220_3$. By sending IOs preferentially to storage systems over paths with lower network latency, it is possible for the application to receive faster responses from the selected storage system, and thus achieve higher performance.

In some embodiments, LD hosts 300 identify storage systems with stretch volumes and use the latency detecting module 310 of the multi-path module 305 to detect paths to storage systems 100 that are of much higher latency. In some embodiments, the LD hosts 300 use an existing Vendor-unique SCSI command to determine actual latency between initiator and target ports. Because these commands are considered a higher priority by the storage systems, they will not get queued in the storage array such that the storage system will immediately respond. Accordingly, the LD hosts 300 are able to determine actual storage area network latency on paths between the LD host 300 and the set of storage systems 100.

Figure 3:
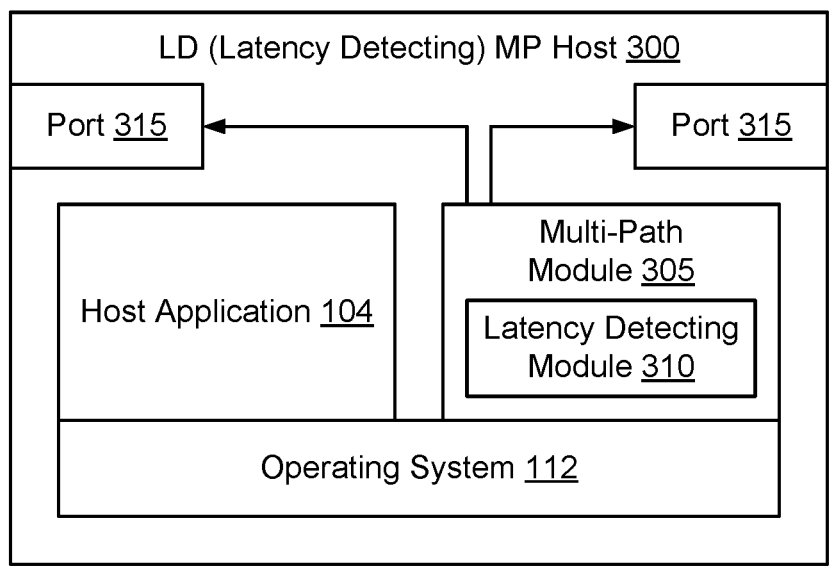
FIG. 3 is a functional block diagram of an example LD (Latency Detecting) MP (Multi-Path) host, according to some embodiments.
Figure 4:
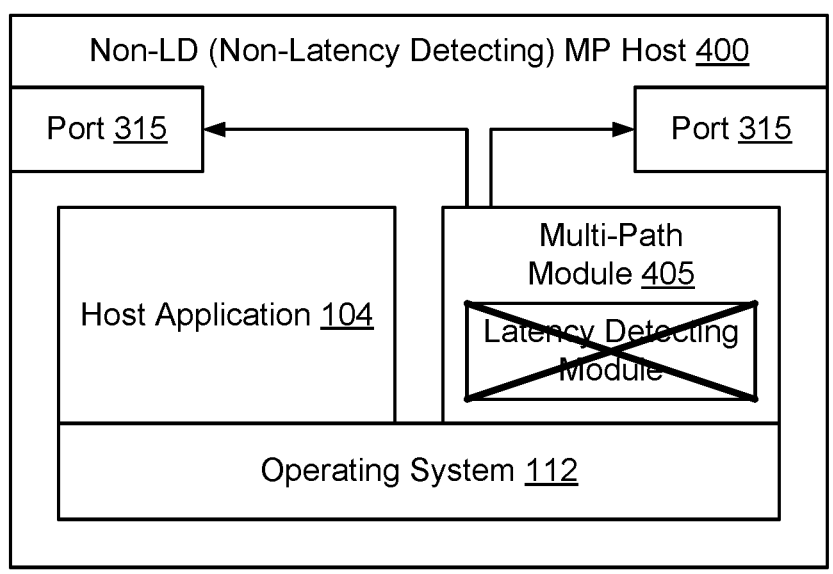
FIG. 4 is a functional block diagram of an example Non-LD (Non-Latency Detecting) MP (Multi-Path) host, according to some embodiments.

Unfortunately, not every host has the ability to detect latency associated with sending IO operations to different storage systems in the storage environment. For example, FIGS. 3 and 4 are functional block diagrams of an example LD (Latency Detecting) MP (Multi-Path) host 300 and an example Non-LD (Non-Latency Detecting) MP (Multi-Path) host 400, respectively. As shown in FIG. 3, in some embodiments a LD host 300 includes a host application 104, operating system 112, and a multi-path module 305 that enables IO operations from the host application to be directed to different ports 315 to be transmitted to different storage systems 100. In the LD host 300 shown in FIG. 3, the multi-path module 305 includes a latency detecting module 310, which is used to detect latency associated with transmitting IO operations to each of the storage systems. By contrast, as shown in FIG. 4, the multi-path module 405 of a Non-LD host 400 does not include a latency detecting module, which means that the Non-LD host 400 does not have the ability to detect the latency associated with sending IO operations to each of the storage systems 100.

One example multi-path technology that includes latency detecting capabilities is referred to as PowerPath. Power-Path™ is host-based software that provides automated data path management and load-balancing capabilities for heterogeneous server, network, and storage deployed in physical and virtual environments. The PowerPath family includes PowerPath Multipathing for physical environments, as well as Linux, AIX, and Solaris virtual environments and PowerPath/VE Multipathing for VMware vSphere and Microsoft Hyper-V virtual environments.

PowerPath currently has the ability to detect different path latencies and identify the optimum storage system on which I/O operations should be transmitted. For example, in the storage environment shown in FIG. 2, if the host 300 is running PowerPath or using another multipath module 305 with latency detecting capabilities 310, the PowerPath application will detect the actual latency between each initiator and target ports on both arrays. In the event that there are significant differences in latency values from the host to any one of storage system ports, PowerPath will avoid sending I/O down to the array with higher latency. For example, in FIG. 2 if path 2 has significantly higher latency than path 1, PowerPath will preferentially direct IO operations to storage system $100_1$, rather than to storage system $100_2$. By utilizing this existing methodology, a performance benefit is achieved by the LD host 300, by enabling the LD host 300 to avoid higher latency paths to the distributed storage volumes 260.

In addition to being able to detect latency, PowerPath also has the capability to capture the SAN fabric Name that an initiator is connected to (edge switch 210) and the initiator's Fibre Channel ID (FCID). Using these details, it is possible to determine which fabric, and which switch within that fabric, an initiator is connected to.

Non-LD hosts 400 that are not running an application such as PowerPath, and instead are running native MPIO (Multi-Path Input/Output), do not have insight as to which paths have high latency and which paths have low latency, and accordingly often dispatch IO operations on paths using pre-defined algorithms (e.g. Round Robin for AIX). This behavior that can lead to performance issues, when the paths to local and remote arrays are subject to varying degrees of latency. In addition, according to the new PowerPath release strategy, future PowerPath releases are to be planned only for Windows, ESXi, and Linux platforms, with no new releases planned for HPUX & AIX. Accordingly, hosts running on these platforms might need to rely on a multipathing solutions such as MPIO (Multi-Path Input Output) without latency detecting capabilities. This will result in lower performance for those Non-LD hosts 400, since the Non-LD hosts 400 will not be able to preferentially route IO operations to storage systems over lower latency paths on the network.

Figure 5:
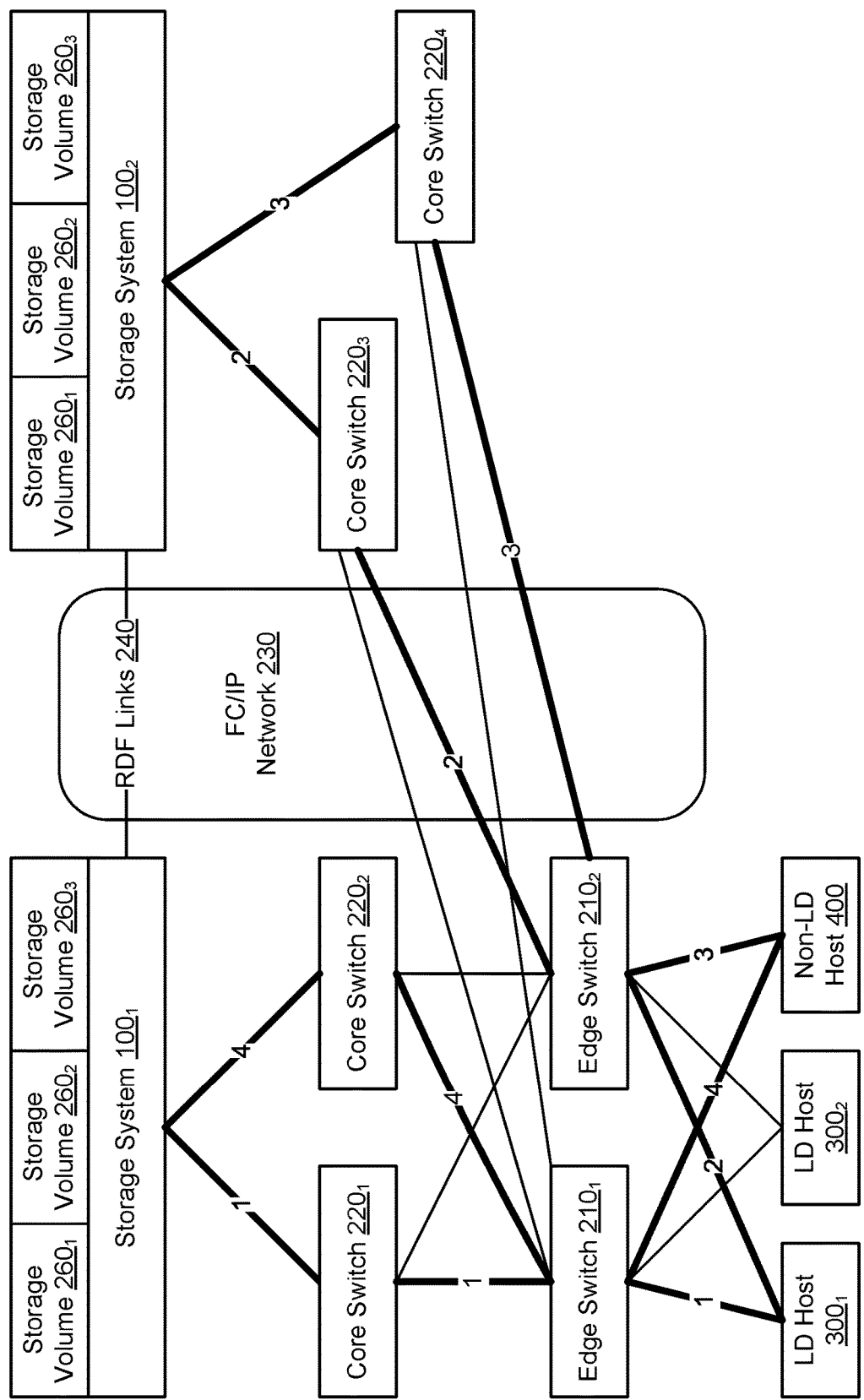
FIG. 5 is a functional block diagram of an example set of LD hosts and a non-LD host connected to storage volumes presented by multiple storage systems, according to some embodiments.

FIG. 5 is a functional block diagram of an example set of LD (Latency Detecting) hosts $300_1$, $300_2$, and a Non-LD (Non-Latency Detecting) host 400 connected to storage volumes $260_1$, $260_2$, $260_3$ presented by multiple storage systems, according to some embodiments. As discussed above in connection with FIG. 2, the LD hosts $300_1$, $300_2$, are able to determine latency on paths through the network to various storage systems 100. However, Non-LD hosts 400, that do not have latency detecting capabilities, are not able to natively detect latency to the various storage systems 100.

According to some embodiments, a method and apparatus for disseminating observed path state latencies between hosts and storage systems is implemented by using LD host's ability to detect latency between hosts and storage systems, as well as using the LD host's ability to detect network path information, such as the SAN fabric name and the initiator's Fiber Channel ID. The LD hosts transmit detected latency and detected network path information to the storage systems. Upon receiving these details from the LD hosts 300, the storage systems use the path information to determine which fabric and switches Non-LD hosts are connected to. If a storage system sees multiple LD hosts that are connected to particular SAN Fabric, and that are reporting significant latency values to a particular storage system, the storage system will modify the ALUA state for the path (e.g. SRDF/Metro active/active) such that the paths using the network fabric/fabric switches identified earlier are set to Active-Non-Optimized. By setting the ALUA state for the path to Active-Non-Optimized, the storage system can signal non-LD hosts to preferentially avoid that path when sending out IO operations.

Asymmetric Logical Unit Access (ALUA), also known as Target Port Groups Support (TPGS), is a set of SCSI concepts and commands that define path prioritization for SCSI devices. ALUA is a formalized way to describe SCSI port status, and access characteristics. ALUA is an industry standard protocol for identifying optimized paths between a storage system and a host. ALUA enables the initiator to query the target about path attributes, such as primary path and secondary path. It also allows the target to communicate events back to the initiator.

In the ALUA protocol, Target ports are given an identifier, which is unique to the target (which in a single_image configuration would be the cluster) and are then organized into target port groups. Target port groups are collections of target port identifiers that share the same access characteristics to a LUN. The host uses a MAINTENANCE_IN command to get the list of all the target port groups for a LUN and uses an INQUIRY request to get the target port ID for a specific path. The host then uses this information to organize the paths. By using new target port IDs available with INQUIRY commands and the REPORT_TARGET_PORT_GROUPS command, it is possible to get the access characteristics for any SCSI target device.

In general, hosts connected to the same network fabric/fabric switches tend to identify one array as the remote array based on higher latency. That "remote" array can make use of the ALUA standard and mark the path from the remote array for the distributed LUNs as Active-Non-Optimized. Since all mainstream native multipathing software solutions are aware of the ALUA standard, they know to avoid using Active-Non-Optimized paths until there are no Active-Optimized Paths available.

FIG. 5 is a functional block diagram of an example set of LD hosts $300_1$, $300_2$, and a non-LD host 400 connected to storage volumes $260_1$, $260_2$, $260_3$ presented by multiple storage systems $100_1$, $100_2$, according to some embodiments. As shown in FIG. 5, in some storage environments LD hosts $300_1$, $300_2$, and non-LD hosts 400 will connect to storage systems $100_1$, $100_2$, using similar network paths. According to some embodiments, by distributing the detected path latency information detected by LD hosts 300 to the storage systems 100, and using the detected latency by the storage systems 100 to set the ALUA state for particular paths, Non-LD hosts 400 using a multi-path module 405 without latency detecting capabilities, such as native MPIO (Multi-Path Input Output) used by AIX, Linux, ESXi, Windows, HPUX, Citrix, VSI OpenVMS etc., are able to avoid transmitting IO operations to non-optimal storage systems thus reducing IO latency for those Non-LD hosts 400.

According to some embodiments, LD hosts 300 share fabric related information along with their observed path latency values to the storage systems 100. The storage systems 100 consume these details, share these details with each other over RDF (Remote Data Forwarding) links 240, and make the necessary ALUA path state changes (e.g. Active-Optimized to Active-Non-Optimized) so that other non-LD hosts 400 which are connected to same Fabric, but which do not have latency detecting capabilities, are also made aware of latency differences between paths to the set of storage systems, to preferentially forward IO operations to storage systems on paths with lower latencies, and thereby reduce applications performance degradations.

Figure 6:
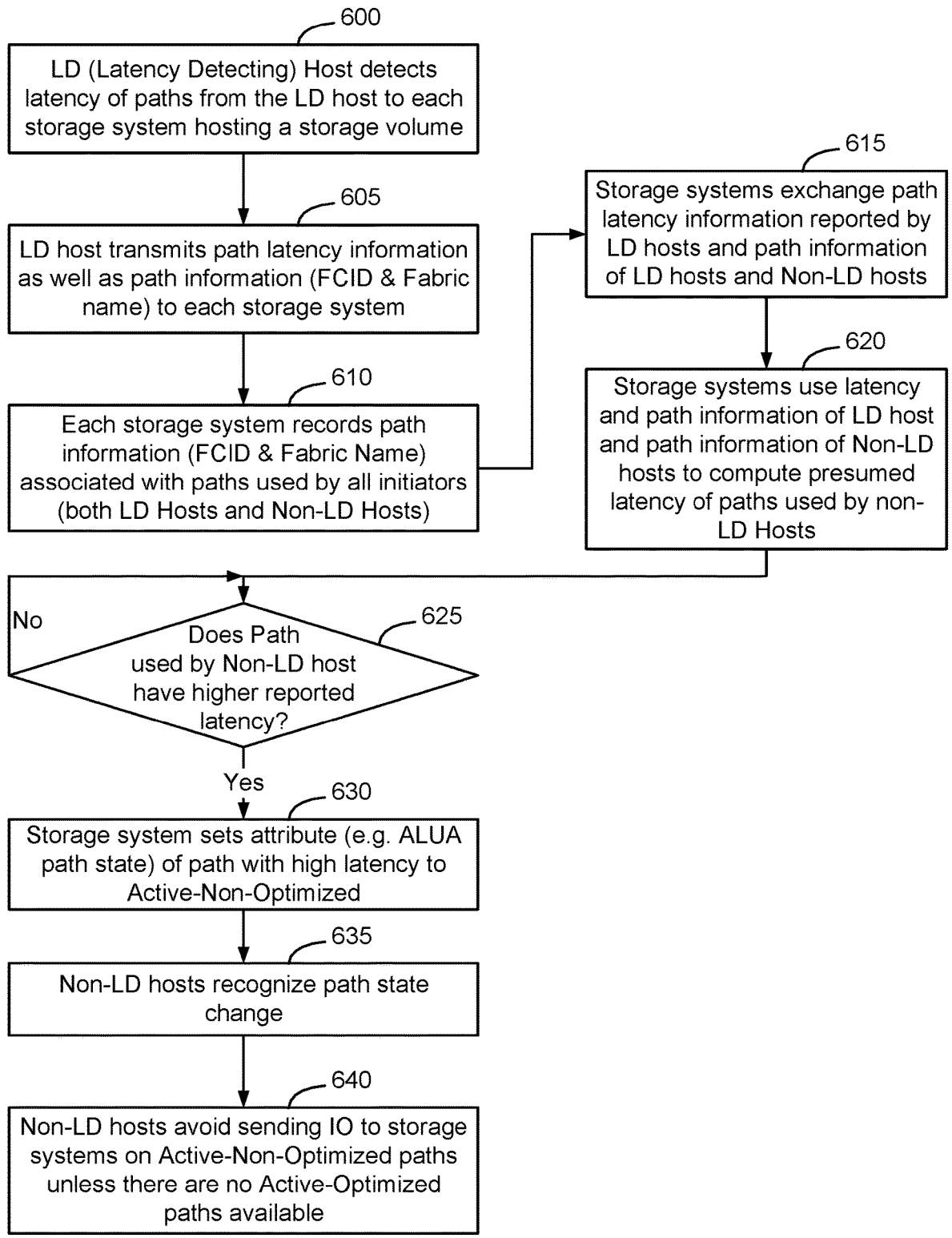
FIG. 6 is a flow chart of an example method of using path latency values observed by latency detecting hosts to optimize path utilization by non-latency detecting hosts, according to some embodiments.

FIG. 6 is a flow chart of an example method of using path latency values observed by LD (Latency Detecting) hosts to optimize path utilization by non-latency detecting hosts, according to some embodiments. As shown in FIG. 6, each LD host 300 detects the latency of each path used by the host to reach each storage system 100 hosting a storage volume 260 (block 600). The LD host transmits path latency information, as well as path information such as the FCID and fabric name associated with the path, to each respective storage system (block 605). In some embodiments, each LD host only transmits latency and path information to a storage system when the path to that storage system has higher latency than another path to another storage system. In other embodiments, each LD host transmits latency and path information to each storage system, and the storage systems share the latency and path information with each other over RDF links 240.

As shown in FIG. 6, in block 605 the LD hosts 300 share the detected latency information, as well as path information. In some embodiments, the path information includes Initiator—Target (bus information) and fabric details, such as FCID (Fiber Channel Identifier) & Fabric name. By sharing this path information, the LD host notifies the storage systems which paths have high latency (block 605).

The storage system 100 also records path information for all Non-LD hosts 400, such as the FCID & Fabric Name associated with each of the other initiators (i.e. Non-LD Hosts 400) and the Fabric to which these initiators are connected (block 610). For example, the storage system 100, in some embodiments, records path information such as FCID and fabric name associated with paths used by all initiators—both LD hosts and non-LD hosts (block 610). The storage systems exchange path latency information reported by the LD hosts and the path information of LD hosts and non-LD hosts (block 615). The storage systems then use the latency and path information reported by LD hosts, and the path information of non-LD hosts, to compute presumed latency values of paths used by the non-LD hosts (block 620). In some embodiments, if a non-LD host reports a path having the same edge switch and core switch attributes as a path used by an LD host, the storage system will assign a presumed latency value to the path used by the non-LD host to be equal to the latency reported on the path by the LD host.

The storage system then determines whether any path used by a Non-LD host has a high reported latency (block 625). If a path has a higher reported latency (a determination of YES at block 625) the storage system will set an attribute of the path to indicate that the path has a higher latency. For example, in some embodiments the storage system 100 will set the ALUA path state of a path with a higher latency to be "Active-Non-Optimized" (block 630).

When the storage system sets the ALUA path state to Active-Non-Optimized, the non-LD hosts will recognize the path state change (block 635) and preferentially avoid sending IO operations to the storage systems on Active-Non-Optimized paths unless there are no Active-Optimized paths available (block 640). Since all mainstream native multipathing software solutions are aware of the ALUA standard, the non-LD hosts are able to avoid using Active-Non-Optimized paths unless there are no Active-Optimized paths available. Accordingly, even hosts that do not have the ability to detect path latency are able to take advantage of the latency detecting capabilities of the LD hosts, to avoid sending IO operations to storage systems over high latency paths. This enables more efficient operation of applications executed by non-LD hosts, to thus speed access to storage volumes for the non-LD hosts.

FIG. 7 is an example host table data structure maintained by storage systems to enable the storage systems to set path state attributes of paths used by LD hosts and non-LD hosts, according to some embodiments. In the example shown in FIG. 7, the host table data structure includes entries about hosts connected to the storage systems, in which each entry includes the host ID 700, FCID 705, Fabric 710, path latency 715, and ALUA state 720. For example, in FIG. 7, the host table includes a first entry for LD host $300_1$, which LD host $300_1$ uses to access a storage volume via edge switch $210_1$ and fabric $220_1$. The reported path latency value for the first entry is 0008 latency units. The host table also includes a second entry for LD host $300_1$, which LD host $300_1$ uses to access a storage volume via edge switch $210_2$ and fabric $220_3$. The reported path latency value for the second entry is 0020 latency units.

When non-LD hosts connect to the storage systems, the paths used by the non-LD hosts are determined by the storage systems and added to the host table. Since the non-LD hosts do not determine path latency values, the entries for the non-LD hosts do not contain reported path latency values. However, where a non-LD host uses the same path as a LD host, a presumed path latency value for the path may be generated by the storage system and used to populate the entries for the non-LD hosts. For example, in FIG. 7 the host table data structure includes a first entry for a first non-LD host $400_1$, which non-LD host $400_1$ uses to access a storage volume via edge switch $210_2$ and fabric $220_3$. Since LD host $300_1$ reported a path latency value for the path of 0020 latency units, the storage system has assigned a presumed latency value to the first entry for non-LD host 400 of 0020 latency units. Similarly, the host table data structure includes a second entry for a first non-LD host $400_1$, which non-LD host $400_1$ uses to access a storage volume via edge switch $210_1$ and fabric $220_1$. Since LD host $300_1$ reported a path latency value for the path of 0008 latency units, the storage system has assigned a presumed latency value to the second entry for non-LD host 400 of 0008 latency units.

As shown in FIG. 7, the storage system compares presumed latency values for the various paths associated with a given host, and sets the ALUA state of the paths with higher presumed latency as Active-Not-Optimized, and sets the ALUA state of the paths with lower presumed latency values as Active-Optimized. Although not shown in FIG. 7, optionally the storage system may also set similar ALUA state for paths used by LD hosts, although doing so is not required since the LD hosts are able to preferentially select paths using the detected latency information regardless of whether a particular path is identified as Active-Optimized or Active-Non-Optimized.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for using path latency values observed by latency detecting hosts to optimize path selection by non-latency detecting hosts, the computer program including a set of instructions which, when executed by a computer, cause the computer to perform a method comprising the steps of:

detecting path latency values by Latency Detecting (LD) hosts on paths connecting the LD hosts to a set of storage systems;

reporting the path latency values, by the LD hosts, to the set of storage systems;

recording the path latency values, by the storage systems, to create a path table, the path table containing entries correlating path information and the path latency values;

detecting path information about a set of paths used by non-LD hosts to access the set of storage systems;

generating a respective presumed latency value for each path of the set of paths used by the non-LD hosts to access the set of storage systems; and setting path state attributes for the paths used by non-LD hosts based on the presumed latency values, to signal the non-LD hosts which paths have higher presumed latency values.

2. The non-transitory tangible computer readable storage medium of claim 1, wherein the non-LD hosts do not have a capability of detecting path latency values on paths used by the non-LD hosts to access the set of storage systems.

3. The non-transitory tangible computer readable storage medium of claim 1, wherein setting the path state attributes comprises determining which paths used by the non-LD hosts have higher latency values.

4. The non-transitory tangible computer readable storage medium of claim 1, wherein the path state attributes are Asymmetric Logical Unit Access (ALUA) state values.

5. The non-transitory tangible computer readable storage medium of claim 4, wherein paths with higher presumed latency values have an ALUA state marked to Active-Not-Optimized, and paths with lower presumed latency values have an ALUA state marked to Active-Optimized.

6. The non-transitory tangible computer readable storage medium of claim 1, wherein the LD hosts and non-LD hosts are multi-path hosts, and wherein the set of storage systems collectively provide access to respective volumes of data for each of the multi-path hosts.

7. The non-transitory tangible computer readable storage medium of claim 1, wherein the step of detecting path latency values by the LD hosts comprises running a multi-pathing software application with path latency detecting capabilities by each of the LD hosts.

8. A method of using path latency values observed by latency detecting hosts to optimize path selection by non-latency detecting hosts, comprising:

detecting path latency values by Latency Detecting (LD) hosts on paths connecting the LD hosts to a set of storage systems;

reporting the path latency values, by the LD hosts, to the set of storage systems;

recording the path latency values, by the storage systems, to create a path table, the path table containing entries correlating path information and the path latency values;

detecting path information about a set of paths used by non-LD hosts to access the set of storage systems;

generating a respective presumed latency value for each path of the set of paths used by the non-LD hosts to access the set of storage systems; and setting path state attributes for the paths used by non-LD hosts based on the presumed latency values, to signal the non-LD hosts which paths have higher presumed latency values.

9. The method of claim 8, wherein the non-LD hosts do not have a capability of detecting path latency values on paths used by the non-LD hosts to access the set of storage systems.

10. The method of claim 8, wherein setting the path state attributes comprises determining which paths used by the non-LD hosts have higher latency values.

11. The method of claim 8, wherein the path state attributes are Asymmetric Logical Unit Access (ALUA) state values.

12. The method of claim 11, wherein paths with higher presumed latency values have an ALUA state marked to Active-Not-Optimized, and paths with lower presumed latency values have an ALUA state marked to Active-Optimized.

13. The method of claim 8, wherein the LD hosts and non-LD hosts are multi-path hosts, and wherein the set of storage systems collectively provide access to respective volumes of data for each of the multi-path hosts.

14. The method of claim 8, wherein the step of detecting path latency values by the LD hosts comprises running a multi-pathing software application with path latency detecting capabilities by each of the LD hosts.

* * * * *